Jan. 30, 1968  E. W. BORROW  3,365,812
SILOS

Filed Sept. 30, 1965  6 Sheets-Sheet 1

INVENTOR
Edgar Wilfred Borrow
BY
ATTORNEY

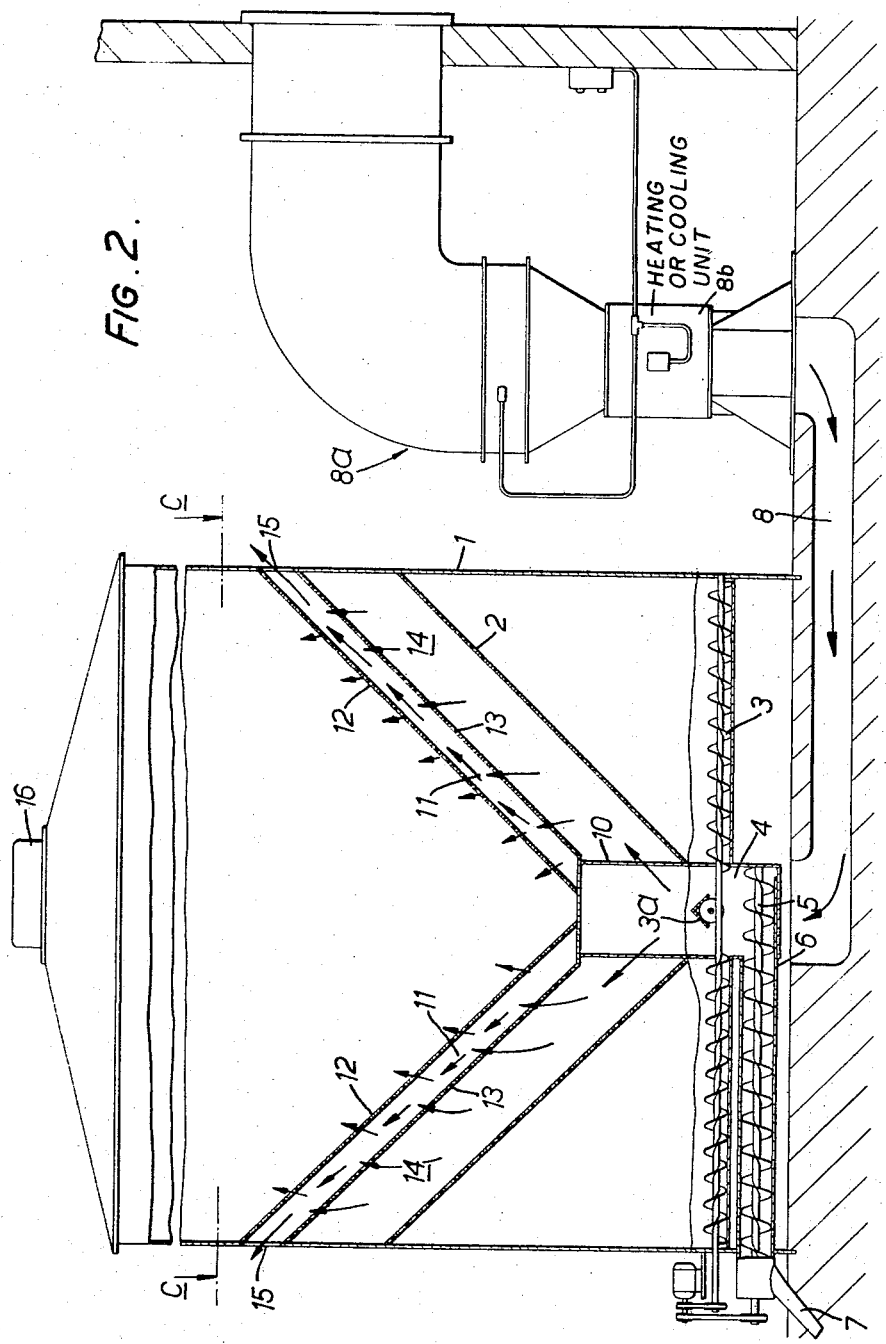

Jan. 30, 1968  E. W. BORROW  3,365,812
SILOS
Filed Sept. 30, 1965  6 Sheets-Sheet 3

INVENTOR
Edgar Wilfred Borrow
BY
ATTORNEY

United States Patent Office 3,365,812
Patented Jan. 30, 1968

3,365,812
SILOS
Edgar Wilfred Borrow, Padnell Farm, Cowplain,
Hampshire, Portsmouth, England
Filed Sept. 30, 1965, Ser. No. 491,589
Claims priority, application Great Britain, Jan. 1, 1965,
106/65
12 Claims. (Cl. 34—167)

ABSTRACT OF THE DISCLOSURE

A grain silo has a circular floor formed by a plurality of perforated sheets providing alternate peaks and troughs. The perforations do not allow grain to pass. Means are provided for passing hot or cold air under the floor and thence through the perforations and up through the grain. Screw augers in the troughs discharge grain into the central reservoir. The reservoir may be emptied through a vertically rising cylindrical pipe incorporating a screw auger and this pipe may be perforated and disposed within a further co-axial pipe to define an annular duct into which hot or cold air is passed to heat or cool grain transported by the auger.

---

The invention relates to silos for containing grain or the like, for example, sand, seeds or loam.

According to one aspect of the invention, there is provided a silo for containing grain or the like, having an undulating floor shaped to provide alternate peaks and troughs.

According to another aspect of the invention, there is provided a silo for containing grain or the like, having a floor comprising at least one pair of substantially flat sheets each of which has an edge which meets an edge of the other sheet in a common line, the two sheets being mutually inclined either in an upward or a downward direction towards the said line.

Two forms of grain silo embodying the invention will now be described by way of example and with reference to the accompanying drawings in which:

FIGURE 2 is a sectional side elevation on the line A—A of FIGURE 1 but with the augers shown displaced through 45° to facilitate an understanding of this embodiment;

Figure 1:
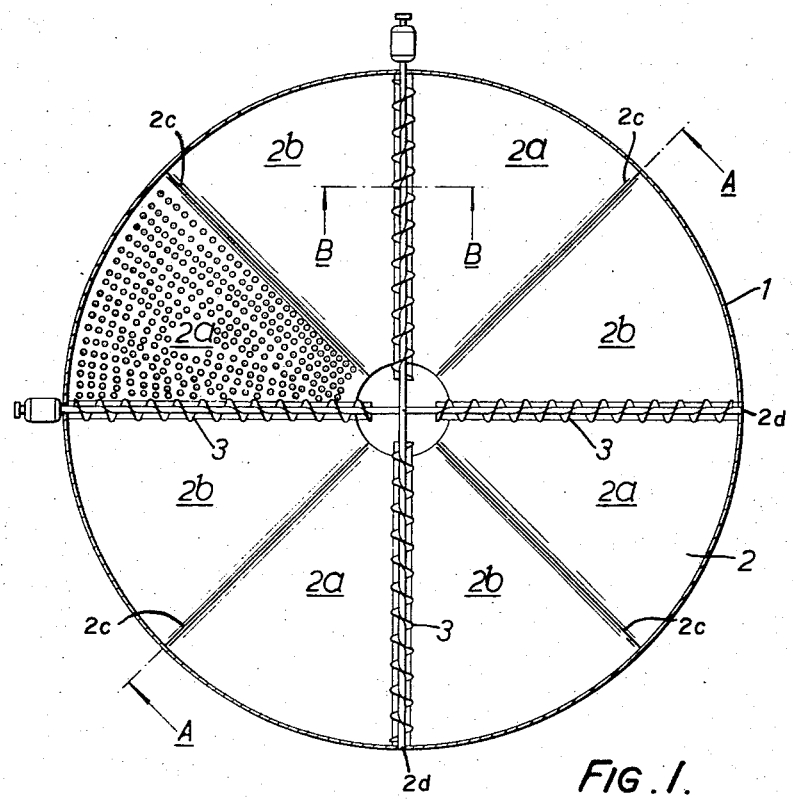
FIGURE 1 is a sectional plan view of one form of silo provided with augers for moving the grain.
Figure 3:
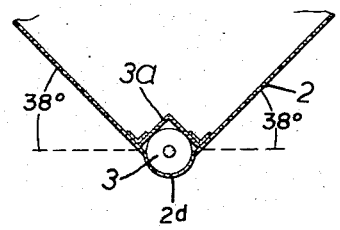
FIGURE 3 is a sectional elevation on the line B—B of FIGURE 1.
Figure 4:
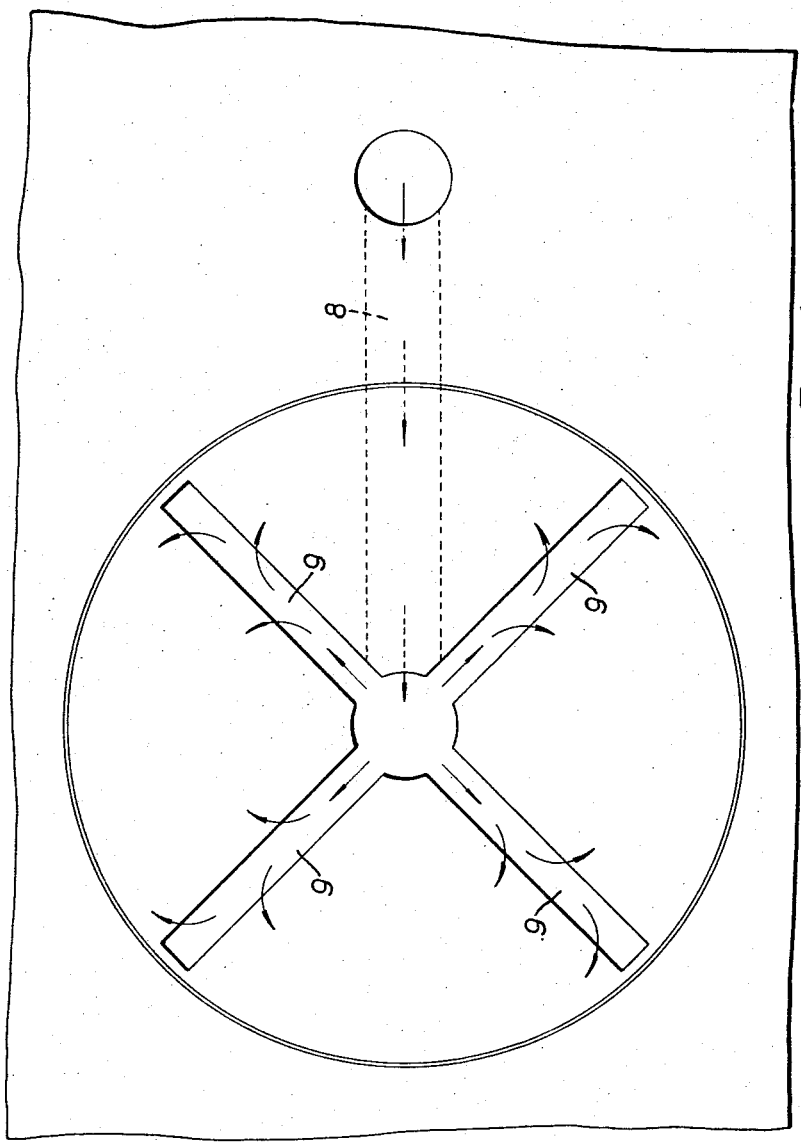
FIGURE 4 is a sectional, somewhat diagrammatic, plan view at ground level of the silo shown in FIGURE 2.

Referring now to FIGURES 1 to 5, the silo has a cylindrical upstanding wall 1 and an undulating grain floor 2.

This floor comprises four sections each of which occupies one quadrant of a circle and comprises two like flat sides 2a, 2b (FIG. 1) inclined to one another at 45° so that their upper edges lie on a common line extending upwardly and outwardly from the centre of the silo at an angle to the horizontal, and their lower edges lie along mutually perpendicular horizontal lines extending radially of the silo and parallel to the axes of augers 3. Each of the floor sections is perforated (only one being so illustrated in FIG. 1), the perforations (exaggerated in size in FIG. 1) being small enough to prevent the passage of grain yet permitting air to pass freely through them.

The lower edges of the adjacent flat surfaces of each adjacent pair of sections meet to form a trough (FIG. 3) and a respective one of the augers 3 extends along each such trough. These augers are mounted on two motor-driven shafts which extend across the base of the silo, the two augers on each shaft having oppositely wound helices so that grain which is directed towards these augers by the sloping sides 2a, 2b of each of the four floor sections is fed towards a reservoir 4 in the centre of the silo. Each of these augers is surmounted by an angled member 3a (FIG. 3) to relieve the augers from the weight of the grain above them.

A further auger 5 lies in a cylindrical housing 6 which communicates with the reservoir 4 and terminates externally of the silo in a grain outlet 7. The auger 5 is also motor driven and it is rotated to transport grain from the reservoir 4 to the grain outlet.

It will thus be seen that when grain falls on to the sloping sides of the sections 2a, 2b, it is directed into the troughs, fed by the augers 3 into the reservoir 4, and then dispensed from the silo by the auger 5.

In addition, means are provided in the silo for drying the grain. For this purpose, an air duct 8 communicates with the space beneath the floor 2 in the silo and a fan assembly 8a is provided for forcing hot air through the duct and upwards through the perforations in this floor. The air is distributed beneath the floor by four radial channels 9 (FIG. 4) each of which lies centrally below one of the perforated sections. The air is heated by a unit 8b.

Figure 5:
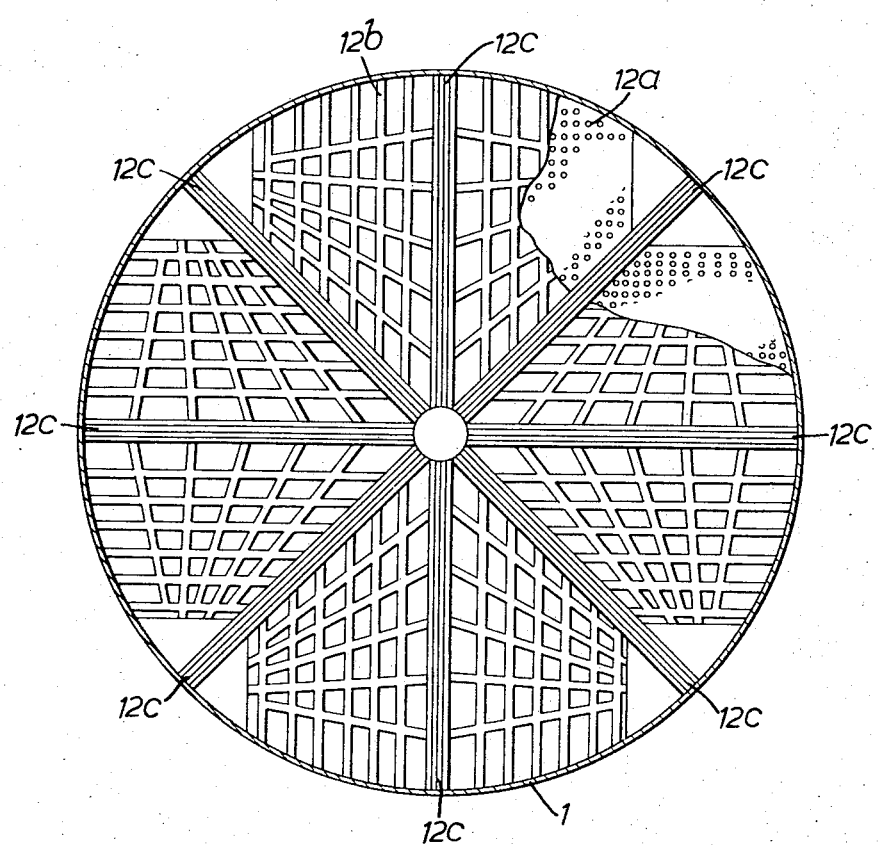
FIGURE 5 is a sectional, plan view of the line C—C of FIGURE 2.

Supported above the floor by a tubular pillar 10 are eight exhaust ducts 11 having upper and lower parallel walls 12, 13 respectively which are perforated to permit the passage of air but not grain. FIGURE 5 shows a plan view of the upper walls 12 which are seen to be built up from perforated sheet 12a laid on to struts 12b. In plan view, each duct 11 is seen to be shaped generally in the form of a sector of a circle and each duct is mounted immediately above, and with its walls 12, 13, parallel to, a respective side 2a or 2b of the adjacent section of the floor 2. The eight ducts 11 are spaced horizontally from one another so as to provide eight radially extending channels 12c (FIG. 5) through which grain can fall to the floor below and hence to the augers. The walls 12 and 13 therefore respectively constitute undulating surfaces parallel to, and above, the floor 2 having apertures, in the form of the channels 12c, permitting the passage of the grain.

The space defined between the floor 2 and the lower walls 13 of the exhaust ducts 11 forms a grain drying compartment 14, the grain entering this space through the channels 12c (FIG. 5) between the exhaust ducts. The hot air passes upwardly through the perforations in the floor sections, traverses the grain in the compartment 14 and enters the exhaust ducts through the perforated lower walls 13. The air is then exhausted from these ducts through exhaust ports 25 in the wall 1 of the silo.

In addition, the grain lying immediately above the upper walls 12 of the exhaust ducts is pre-dried to some extent since a proportion of the hot air in the exhaust ducts passes upwardly through the perforations in the upper walls instead of being exhausted through the ports 15.

The silo may be modified so that the exhaust ducts continue upwardly along the inner sides of the silo walls, instead of terminating in the exhaust ports 15, and then extend inwardly at the top of the silo so as to terminate in a common duct. In this case the hot air would be exhausted through this common duct at the top of the silo instead of being exhausted through ports 15.

Further, the four radial channels 9 for distributing the air beneath the floor may be omitted, and the air duct 8 may simply terminate at a central point beneath the floor, that is, beneath the reservoir 4.

The silo can be employed for cooling instead of heating the stored grain and in this case pre-cooled air is used instead of hot air. If desired, the exhaust ports 15 may be closed so that the cold air is forced through the drying compartment and thence upwardly through the perforations in the exhaust ducts and then upwardly through the whole column of grain stored in the silo, the air being exhausted through a port 16 in the top of the silo. In this case, the unit 8b is a refrigerator instead of a heating unit.

Figure 6:
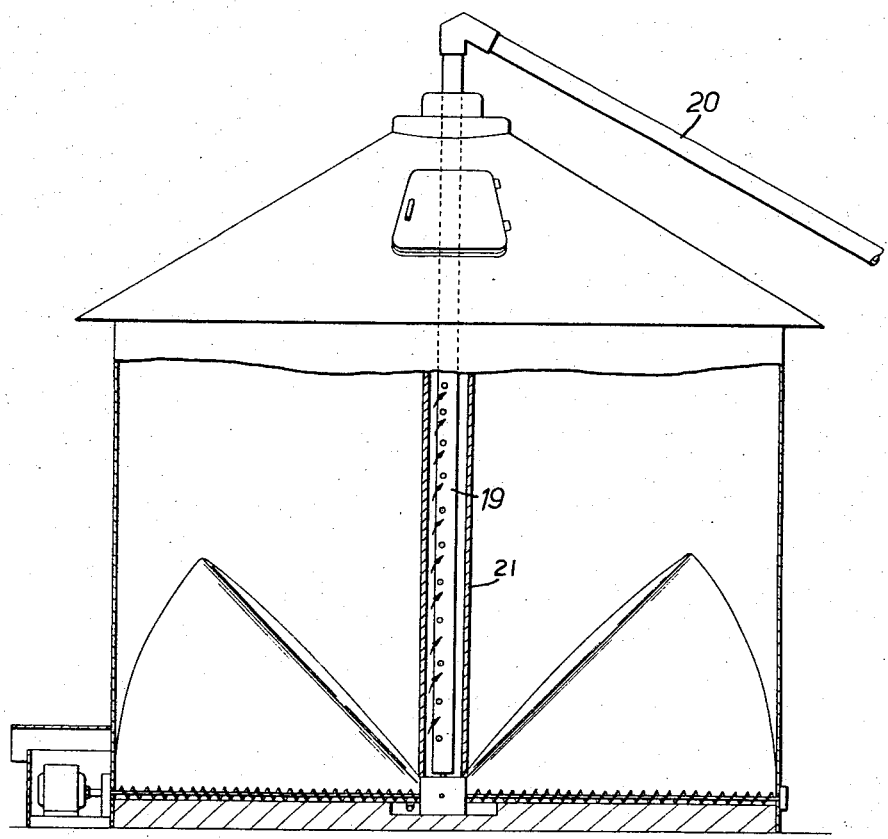
FIGURE 6 is a sectional, side elevation of another form of silo.
Figure 7:
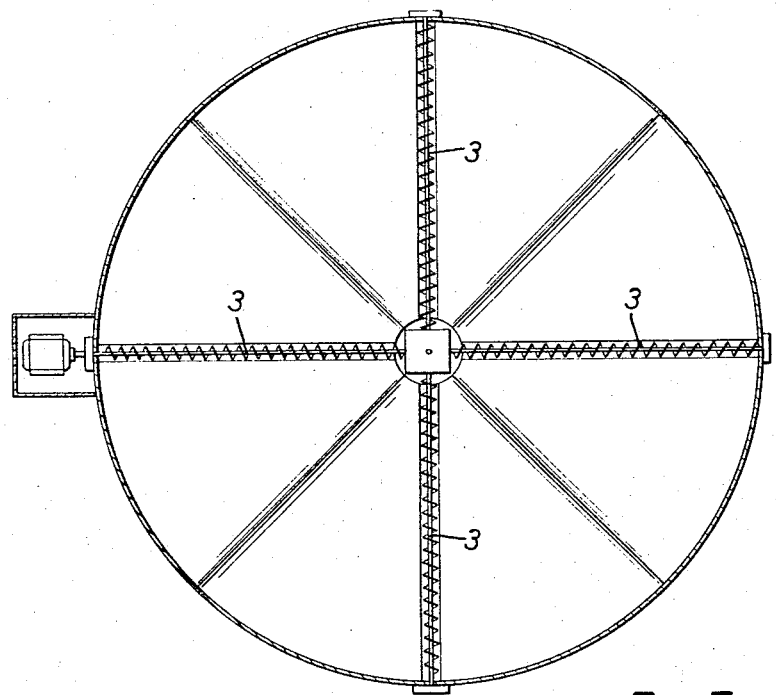
FIGURE 7 is a plan view of the silo shown in FIGURE 6.
Figure 8:
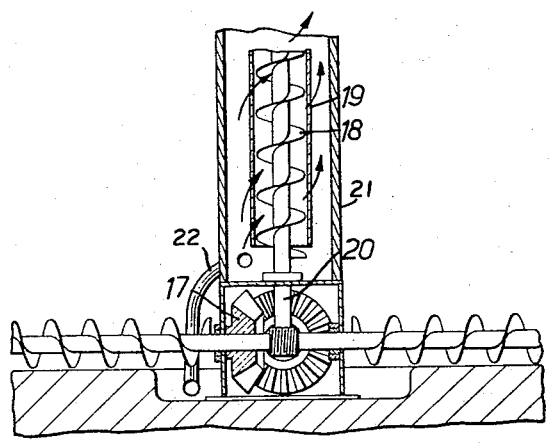
FIGURE 8 is a sectional side elevation of a detail of the silo shown in FIGURE 6.

Referring now to FIGURES 6 to 8, there is shown another form of the grain silo. The floor 2 of this silo is constructed in the same manner as the floor 2 shown in the FIGURES 1 to 5 but in this case it is not constructed from perforated material since there are no facilities for forcibly drying the stored grain. If the grain is to be forcibly dried, the floor 2 may be perforated in the same manner as the silo shown in FIGURES 1 to 5.

Four augers 3 (FIG. 7) again lie in troughs in a plane parallel to the base of the silo. Two of these augers 3 are mounted on a common motor-driven shaft and a bevel gear 17 is carried by this shaft for driving the two shafts on which the other augers 3 are mounted. The helices on the augers are again wound so that the grain falling onto these augers is fed towards the centre of the silo.

In contrast to the silo shown in FIGURES 1 to 5 however, the grain fed to the centre of the silo is transported upwardly by an auger 18 disposed in an upstanding cylinder 19 and driven by worm gearing 20 (FIG. 8) on the motor driven shaft. The grain is thus dispensed from the top of this silo through an outlet pipe 20 communicating with the cylinder 19.

With this method of grain transport, the grain may be cooled by passing cold air through it as it is transported through the cylinder 19. In this case the cylinder 19 is disposed within a coaxial cylinder 21, so that an annular air flow duct is formed between the two cylinders, and the cylinder 19 is perforated at areas spaced along the length of this cylinder and on opposite sides thereof. The perforated areas are staggered along the length of the cylinder so that a perforated area on one side of the cylinder lies immediately opposite an unperforated area on the other side of the cylinder. Cold air is fed into the annular duct through a pipe 22 and therefore passes obliquely across the cylinder 19 through the perforated areas on opposite sides of this cylinder.

Alternatively, hot air can be passed through the annular duct by means of the pipe 22 to dry the grain during its passage through the cylinder 19. The pipe 22 may be supplied from an assembly similar to the assembly 8a, 8b and 9 of FIG. 2.

The auger 18 may conveniently be replaced by an elevator.

Instead of employing separate augers 3 and 18 to dispense the grain as described above, the direction of the helix on one of the augers 3 can be reversed and an outlet port formed in the silo wall 1 adjacent this auger to receive the grain fed thereto.

Although the invention has been described with reference to a silo of circular cross-section, it is also applicable to silos of rectangular or other shaped cross-sections.

Further, although the floor sections slope downwardly at 45° in the embodiments described, they could be sloped at other angles, e.g. 60° or 30°, and the floor could comprise a greater, or a less number than the four sections disclosed, and have a corresponding number of augers.

The rotational speed of the augers may be varied in dependence on the moisture content of the grain so as to ensure an adequate drying time, and the grain may be re-circulated through the silo by transporting the grain dispensed from the outlet into an inlet duct in the top of the silo. This may conveniently be effected by further augers or by an elevator.

Although the invention has been described with reference to a complete silo, it is apparent that the principal features of this invention are concerned with the lower parts of the silo which support the grain. Accordingly, it is to be understood that this invention could be incorporated in silos in which the walls bounding the major length of the upstanding column of grain have a constructional form different from that shown.

It has been found advantageous to construct the silo floor 2 so that the angle to the horizontal of the sides 2a and 2b is approximately 38° when the silo is to be used to contain grain. The optimum angle may be different when the silo is used to contain other materials.

It will be apparent that the undulating construction of the floor of the forms of silo described is advantageous in that it greatly increases the effective floor area and permits easy transport of the grain along the floor. The great increase in effective floor area enables drying or chilling of the grain to be carried out more effectively.

I claim:

1. A silo for containing grain or the like, having a floor comprising a plurality of pairs of substantially flat sheets, one sheet of each pair having an edge which meets an edge of the other sheet in the pair in a respective first common line, the sheets in each pair being mutually inclined in a downward direction from the respective said first common line, each sheet in a pair having a further edge which meets a further edge of a sheet in the adjacent pair in a second common line so that the said floor has alternate peaks and troughs, sides extending upwardly from the periphery of the floor, a first intermediate surface mounted between the said sides and spaced above the said floor so as to be parallel thereto at substantially all points, the first intermediate surface defining perforations permitting the passage of gas but not grain, a second intermediate surface mounted between the said sides and spaced above the first intermediate surface so as to be parallel thereto at substantially all points, means connecting the space between the first and second intermediate surfaces to the outside of the silo, the first and second intermediate surfaces defining openings therethrough to permit grain or the like to pass from above the said second intermediate surface to the said floor, and means communicating with the space between the floor and the first intermediate surface for passing gas through the grain on the said floor and thence to the outside of the silo through the said space between the first and second intermediate surfaces.

2. A silo according to claim 1, including transporting means disposed in each said trough for transporting grain along the trough.

3. A silo for containing grain or the like, comprising
a circular floor, and a casing extending upwardly from the periphery of the floor,
the said floor comprising a plurality of pairs of substantially flat sheets, each said pair of flat sheets having the shape of a sector of a circle when projected on to a horizontal plane, one sheet of each pair having an edge which meets an edge of the other sheet of the the pair in a respective first common line inclined downwardly towards the centre of the floor, the sheets in each pair being mutually inclined in a downward direction from the respective said first common line, and each sheet in a pair having a further edge which meets a further edge of a sheet in the adjacent pair in a second, horizontal, common line, so that the said floor has alternate peaks and troughs,
a screw auger disposed in each said trough,
a reservoir for grain or the like disposed centrally in the said circular floor,
a further screw auger for transporting the grain or the like fom the reservoir, and
driving means connected to the said augers for rotating them to transport the grain or the like.

4. A silo for containing grain or the like, including
a floor, and a casing extending upwardly from the periphery of the floor,
the floor comprising a plurality of pairs of usbstantially flat sheets, one sheet in each pair having an edge which meets an edge of the other sheet of the pair in a respective first common line which extends upwardly and outwardly from the centre of the floor, the sheets in each pair being mutually inclined in a downward direction from the respective first common line, each sheet in a pair having a further edge which meets a further edge of a sheet in the adjacent pair in a second, horizontal, common line so that the said floor has alternate peaks and troughs,
a first, perforated, tubular pillar mounted at the said centre of the floor and rising therefrom,
a second, unperforated, tubular pillar mounted at the centre of the floor and rising therefrom, the second pillar being disposed concentrically with but outside of the said first pillar so that the pillars define a duct between them,
a rotatable element disposed vertically inside the said first pillar for receiving grain or the like from the said centre of the floor and for raising the grain or the like from the centre of the floor to the outside of the silo, and
means connected to the said duct for passing gas along the duct and through the perforations in the said first pillar.

5. A silo according to claim 4, including means for pre-heating the said gas.

6. A silo according to claim 4, including means for pre-cooling the said gas.

7. A silo for containing grain or the like, including
a base,
a casing extending upwardly from the said base,
a floor for grain or the like mounted in the said casing above the said base,
the floor being formed by a plurality of substantially flat abutting sheets disposed in side-by-side relationship around the centre of the floor, adjacent sheets being oppositely inclined to the horizontal to form in the floor a series of alternate peaks and troughs so that the base, the casing, and the floor together define a space under each said peak,
each said sheet defining perforations permitting the passage of gas therethrough but not grain or the like,
means communicating with the said space under each said peak for passing gas thereinto whence the gas passes through the said perforations and through grain or the like on the said floor, and
transporting means disposed in each said trough for transporting the grain or the like therealong towards the centre of the floor.

8. A silo according to claim 7, including a reservoir for grain or the like disposed at the said centre of the floor for receiving grain from the said transporting means, and further transporting means for transporting the grain or the like from the reservoir.

9. A silo according to claim 7, in which each transporting means is a screw auger, and including driving means connected to each screw auger for rotating it.

10. A silo according to claim 7, including means for pre-heating the said gas.

11. A silo according to claim 7, including means for pre-cooling the said gas.

12. A silo according to claim 7, in which each said sheet is inclined to the horizontal at an angle of 38°.

References Cited

UNITED STATES PATENTS

| | | | |
|---|---|---|---|
| 591,696 | 10/1897 | Rothenbach | 198—54 |
| 595,310 | 12/1897 | Johnston | 34—174 |
| 964,342 | 7/1910 | Velilla | 34—174 X |
| 2,509,175 | 5/1950 | Sohanin | 34—102 |
| 2,660,806 | 12/1953 | Whitesel | 34—225 X |
| 2,745,193 | 5/1956 | Ladd et al. | 34—174 X |
| 2,772,487 | 12/1956 | Arndt | 98—55 X |
| 2,960,320 | 11/1960 | Heider. | |

FOREIGN PATENTS

| | | |
|---|---|---|
| 1,240,534 | 8/1960 | France. |
| 671,085 | 4/1952 | Great Britain. |

FREDERICK L. MATTESON, JR., *Primary Examiner.*

A. D. HERRMANN, *Assistant Examiner.*